United States Patent

[11] 3,619,249

| [72] | Inventor | William A. Cannon |
| | | Garden Grove, Calif. |
| [21] | Appl. No. | 749,944 |
| [22] | Filed | Aug. 5, 1968 |
| [45] | Patented | Nov. 9, 1971 |
| [73] | Assignee | McDonnell Douglas Corporation |
| | | Santa Monica, Calif. |

[54] A METHOD FOR PRODUCING A FLUOROCARBON COATING ON METALS AND CERAMICS AND THE PRODUCT THEREOF
12 Claims, No Drawings

[52] U.S. Cl.................................................. 117/62.1, 117/87, 117/89, 117/92, 117/123, 117/134, 117/135, 117/167, 117/168
[51] Int. Cl..................................................... B44d 1/48, B44d 1/36
[50] Field of Search............................................ 17/62.1, 62.2, 89, 49, 106, 132 CF, 134, 135, 167, 168; 260/653.9, 653.8, 653.4

[56] References Cited
UNITED STATES PATENTS

| ,776,918 | 1/1957 | Bernsworth................ | 117/50 |
| 2,711,972 | 6/1955 | Miller et al.................. | 260/653.9 |
| 3,032,435 | 5/1962 | Michel........................ | 117/89 |
| 3,429,937 | 2/1969 | Blackley et al............. | 117/135 |
| 2,998,459 | 8/1961 | Baker et al.................. | 250/653.9 |
| 2,918,390 | 12/1959 | Brown et al................. | 117/89 |
| 3,419,414 | 12/1968 | Marks......................... | 117/49 |
| 3,304,276 | 2/1967 | Faulkner et al............. | 117/89 |
| 2,944,917 | 7/1960 | Cahne........................ | 117/49 |

FOREIGN PATENTS

| 826,566 | 12/1956 | Great Britain............... | 117/63 |

Primary Examiner—William D. Martin
Assistant Examiner—M. Sofocleous
Attorney—Max Geldin ABSTRACT: Fluorocarbon coated metals and ceramics and method therefor. The metal or ceramic substrate is treated with a polar organic material to effect chemisorption of a monomolecular layer. A viscous saturated hydrocarbon coating, e.g., of petrolatum, is applied over the chemisorbed layer and is fluorinated to convert the hydrocarbon to the corresponding fluorocarbon. Such fluorocarbon coated metals and ceramics are useful for antisticking, anticorrosion and antifriction applications.

A METHOD FOR PRODUCING A FLUOROCARBON COATING ON METALS AND CERAMICS AND THE PRODUCT THEREOF

This invention relates to fluorocarbon coating of metals and ceramics, and particularly to the production of hard, adherent fluorocarbon coatings on such materials by a method which involves chemisorption of a polar organic material, e.g., a fatty acid, coating with a preferably high molecular weight saturated hydrocarbon, e.g., petrolatum, and fluorinating to convert the hydrocarbon to the corresponding fluorocarbon.

In recent years there has evolved considerable interest in fluorocarbon polymers and especially in fluorocarbon coatings for metals and other materials to provide the coated materials with antistick, anticorrosion, and antifriction properties. These properties are highly desirable for many applications including the coating of metals used for kitchen appliances and utensils to provide nonstick, easy cleaning properties and also to protect metals from corrosion especially when such uncoated metals are exposed to salt air or are used for storage of corrosive chemicals such as fluorine. Many conventional films have been tried but each of these suffer one or more disadvantages of being hygroscopic and failing to protect the metal against oxidation when exposed to air or against abrasion particularly with respect to kitchen appliances and utensils. Conventional Teflon (polytetrafluoroethylene) coatings appeared promising but did not meet the requirements. Furthermore, Teflon was found to be difficult to apply, especially to internal surfaces, and resulted in a relatively thick film which is nonadherent.

Teflon is supplied as a water-based dispersion for application to metal or glass. Two coats of the enamel are recommended. The primer coat contains a proprietary additive to improve adhesion of the polymer to the substrate and is applied to the substrate, baked at 750° F., followed by roughening by grit blasting or acid etching. The second or finish coat may contain pigment for color but does not contain an adhesion additive to reduce the antistick property of the polymer. The finish coat, applied over the primer coat, is baked at 750° F. See Modern Plastics, 42, 88 (Feb. 1965), "Fluorocarbons Move Into Consumer Goods."

Tetrafluoroethylene polymers have been available now for many years. In 1941, R. S. Plunkett (U.S. Pat. No. 2,230,654) first patented the polymerization of tetrafluoroethylene by employing a catalyst, e.g., $ZnCl_2$ or $AgNO_3$, under pressure or in the presence of a solvent, e.g., $AgNO_3$ and methyl alcohol. In subsequent patents to Brubaker (U.S. Pat. No. 2,393,967), Joyce (U.S. Pat. No. 2,394,243) and Renfrew (U.S. Pat. No. 2,534,058), the process was refined by use of high pressure and suitable catalysts. Brubaker employed a pressure reactor with a catalyst consisting of a weak aqueous solution of alkali or ammonium persulfate and an alkaline buffer. In the process disclosed by Joyce, polymerization was conducted in the presence of water which could be alkaline or acidic, and using oxygen and diacyl peroxides as catalysts. Renfrew employed dibasic acid peroxide catalyst to form stable water dispersions of the polymer.

In 1963, R. H. Halliwell (U.S. Pat. No. 3,110,704) disclosed polymerization of tetrafluoroethylene in an aqueous medium containing persulfate as initiator and Cu as an accelerator. Later, in 1966, D. P. Graham in the "Journal of Organic Chemistry" 31, 955 (1966) reported that tetrafluoroethylene could be polymerized with itself in the presence of CsF on an active-carbon support or in an activating solvent. The reaction was believed to proceed by the formation of the perfluoro carbanion, $CF_3CF_2^-$, addition of the perfluoro carbanion to a molecule of tetrafluoroethylene, elimination of fluoride ion to yield an olefin, and addition of another perfluoro carbanion. In the buildup of the larger molecules, the olefins or the carbanion may contain two or more ($-CF_2-CF_2-$) groups.

It has now surprisingly been discovered that a fluorocarbon coating can be formed on the surface of a metal or ceramic by an unique method which comprises first treating the metal or ceramic surface, which is substantially free of oxide scale and other contaminants, with a polar organic material such as a fatty acid, to effect chemisorption of a monomolecular layer thereon. A thin coating of a saturated high molecular weight hydrocarbon is applied over the chemisorbed layer, followed by fluorination with gaseous fluorine to convert the hydrocarbon to the corresponding fluorocarbon. The fluorocarbon coating formed is dense and adherent.

Thus, the method of the invention provides an adherent, chemically bonded, integral, highly protective, thin, hard, very corrosion resistant fluorocarbon coating by an economical, simple three-step process which does not require excessive temperatures or pressures or extensive capital equipment. Chemisorption and coating of the saturated hydrocarbon can conveniently be conducted in batch form and fluorination of the hydrocarbon coated specimens can be conducted inside a reaction chamber or, in the case of larger surfaces such as the inside of a tank or pipe, the vessel itself can serve as the reaction chamber. The process is particularly suited for the coating of production parts and internal surfaces with no limitation on the surface contours since chemisorption and wax coating are preferably and conveniently applied from solution, as by immersion or spraying, and fluorination is conducted in the gas phase.

The fluorocarbon coating produced by the process of the invention exhibits excellent adhesion to the metal or ceramic substrate since it is an integral part of the surface structure resulting from a chemical bond.

The fluorocarbon coating, moreover, is distinguished by its low friction which provides well bonded, solid, film lubricating layers. The coating or film is dense and continuous, repelling water and is impervious to permeation of liquids. Metal surfaces protected by such coating produced by the process of the invention are resistant to damage from corrosive chemicals.

The thickness of the fluorocarbon coating produced according to the invention is considerably less than required for conventional fluorocarbon coating systems. For example, with the process of the invention, a thickness of about 1 to about 5 microns (0.04–0.20 mils) provides excellent protection as compared with 250 microns (10 mils) for other conventional systems.

As previously stated, the method of the invention first involves treatment of a metal or ceramic surface, which is substantially free of oxide scale or other contaminants, with a polar organic material to effect chemisorption of a monomolecular layer of such material on the substrate. As used in the specification and claims, the term "chemisorption" refers to the chemical adsorption arising from a chemical bond formation between an adsorbent, e.g., the metal or ceramic substrate, and adsorbate, e.g., a polar organic material, which takes place in a monolayer on the surface of the adsorbent.

The process is applicable to the fluorocarbon coating of metals and ceramics. Example of metals which can be coated include among others, steels, stainless steels, aluminum, zinc, nickel, copper, iron, manganese, cobalt, platinum, titanium, chromium, and the oxides and alloys thereof. The above list is intended to be exemplary and the invention is not limited to those metals noted. By the term "metal" as used in the specification and claims is meant to include metals and metal compounds as for example metal oxides, and alloys, in bulk and particulate form, including powders and fibers Ceramics, for example alumina, zirconia, hafnia and thoria can also be coated by the method of the invention. The ceramic should be of a type on which a chemisorbed film can be formed, and the ceramic composition must be resistant to attack by fluorine and hydrogen fluoride. Hence the use of high silica-containing ceramics which can be attacked by hydrofluoric acid are not preferred. The material of the substrate to be treated is limited only by its ability to receive a chemisorbed film or by sensitivity to fluorine gas and hydrogen fluoride.

It is preferred that the surface of the metal or ceramic be substantially free of oxide scale and contaminants prior to treatment. Oxide scale is conveniently removed from metals by short immersion in a light acid bath. For example oxide scale from stainless steel can be removed by a 30 second immersion in 1:1 HCl at 150–160° F. As a further example, oxide scale can be removed from aluminum and aluminum alloys by a 1 to about 5 minutes immersion in an aqueous solution comprising 1 percent by weight HF and 1 percent by weight $HNO_3$. Various other methods can be employed for removal of oxide scale and contaminants from metals and ceramics and it is to be understood that the invention is not limited by any particular method. It has been found that certain proprietary metal cleaners which may contain phosphates or surfactants are unsatisfactory because they leave chemisorbed films and other contaminants which interfere with the subsequent chemisorption of the polar organic material. Also, proprietary aluminum cleaners appear to have similar drawbacks, and for these reasons such materials are not recommended.

The polar organic material which is chemisorbed onto the metal or ceramic substrate is one having polar functional groups comprising carboxyl, phenolic and quaternary ammonium groups and mixtures thereof. Examples of such materials include among others organic acids, phenols such as nonyl phenol, and dimethyloctadecyl ammonium chloride. Those polar organic materials having carboxyl groups are preferred because of their effectiveness in speed and tenacity of adsorption. The polar organic materials which are preferred are the fatty acids, particularly those defined by the general formula $C_nH_{2n+1}COOH$, wherein $n$ is an integer of from about 4 to about 26. The fatty acids which are most preferred are those where $n$ is about 5 to about 17. The shorter chain acids can be employed, but have a tendency to be volatile, and the longer chain acids are not readily available commercially. Examples of certain of the preferred fatty acids are given below:

| Common Name | Chemical Name | General Formula $C_nH_{2n+1}COOH$ |
| --- | --- | --- |
| Caproic | Hexanoic Acid | $n=5$ |
| Caprylic | Octanoic Acid | $n=7$ |
| Capric | Decanoic Acid | $n=9$ |
| Lauric | Dodecanoic Acid | $n=11$ |
| Myristic | Tetradecanoic Acid | $n=13$ |
| Palmitic | Hexadecanoic Acid | $n=15$ |
| Stearic | Octadecanoic Acid | $n=17$ |

The acids of the general formula given above where $n$ is an odd number, e.g., pelargonic, undecyclic, tridecylic, are less common but can also be employed. Substituted fatty acids also can be employed, such as nonylphenoxyacetic acid. Chemisorption of the polar organic material can be achieved by any convenient method which brings the metal or ceramic substrate in contact with the polar organic material. For example, if the polar organic material is a liquid at room temperature, this can be accomplished, for example, by dipping, spraying, or brushing. If the polar organic material is a solid, for example at ambient temperature, as is the case of certain of the above-mentioned fatty acids, these materials can be diluted with a nonpolar solvent to the desired viscosity. Most desirably, the solvent should be one combining good solvent action for the polar organic material and which is nonpolar in nature so that it will not compete for adsorption sites on the substrate, i.e., to be preferentially adsorbed. From the standpoint of cost and convenience a volatile solvent is preferred. The choice of solvent will depend on the identify of the polar organic material. For the fatty acids mentioned above, excellent results have been obtained with hydrocarbon solvents, e.g., n-hexane, n-heptane, cyclohexane, isooctane. Of these the latter, isooctane, is most readily obtained in a relatively pure form. The concentration of polar organic material in the solution can range over side limits. For the fatty acids disclosed above where $n$ is about 5 to about 17 it has been found that a 1 percent solution by weight of the acid in the solvent is practical since this concentration avoids depletion of the solution arising from excessive dragout. For more concentrated solutions, it is desirable to include rinsing of the chemisorbed layer with the solvent to remove any evaporation residues, although this step is not necessary. It should be understood that chemisorption can be attained without the use of a solvent. Such use is optional, and the invention is not limited to the choice or use of a particular solvent.

Chemisorption can also be achieved from the vapor phase and in some cases, such as for the coating of the interior of large vessels, chemisorption from the vapor phase can be most advantageous as well as economical.

Agitation of the solution when chemisorption is achieved by immersion appears to speed up the rate of chemisorption somewhat but is not necessary since normal convection supplies sufficient mass transport. From a practical standpoint, chemisorption is most economically conducted at ambient temperature. However, higher or lower temperatures can be employed, e.g., ranging from about 10° C. to about 50° C. If a nonvolatile solvent is employed, heat can be applied to evaporate the solvent.

The metal or ceramic substrate should be exposed to the polar organic material for a time sufficient to allow chemisorption i.e., the formation of a monomolecular layer, to take place. Monomolecular layer formation takes place quite rapidly from solution. For example, monolayers of stearic acid and nonylphenoxyacetic acid were formed on stainless steel in 15 minutes from isooctane and nitromethane solutions. Some slight additional adsorption appears to occur up to about one hour or longer. While longer adsorption times are not harmful, there is not advantage to such practice.

Upon formation of the chemisorbed monolayer, the specimen is generally allowed to air dry. When chemisorption takes place from the solution, the drying period permits evaporation of the solvent. If a nonvolatile solvent is employed, heat can be applied to evaporate the solvent.

The chemisorbed monolayer of polar organic material is then coated with a uniform, thin layer of a saturated hydrocarbon, preferably of high molecular weight. The saturated hydrocarbon employed according to the invention is a semisolid to solid hydrocarbon, i.e., in the form of a hydrocarbon wax, the term "hydrocarbon wax" denoting and including in the present specification and claims, viscous hydrocarbon oils, hydrocarbon waxes and hydrocarbon greases. Saturated hydrocarbons having at least 17 carbon atoms are preferred, such hydrocarbons generally containing from about 17 to about 50 carbon atoms. Although pure saturated hydrocarbons as defined above can be employed, generally the semisolid to solid hydrocarbons utilized are complex mixtures of such hydrocarbons, having an average of at least about 17 carbon atoms, generally about 17 to about 50 carbon atoms. Such complex materials, e.g., petrolatum, however, generally contain minor portions of unsaturated hydrocarbons and other impurities such as aromatic hydrocarbons, and hence the term "saturated hydrocarbon" as employed herein can include the above noted minor amounts of impurities.

Examples of saturated hydrocarbons which can be employed according to the invention include petrolatum, paraffin wax, paraffin jelly, Vaseline, cosmoline, vasoliment, ozocerite wax, ceresin wax and the so-called Apiezon waxes and greases.

Preferred saturated hydrocarbons for use in the invention include petrolatum and the hydrocarbon waxes and greases marketed as Apiezon N and L sold by the James G. Biddle Co., Plymouth Meeting, Pa. 19462. The chief constituents of petrolatum are the hydrocarbons of the methane series ($c_{16}H_{34}$ up to $C_{32}H_{66}$). and of the olefin series ($C_{16}H_{32}$ up to $C_{32}H_{66}$). Petrolatum is a yellowish to white, semisolid, unctuous hydrocarbon mixture. Density, ($d_{25}^{60}$) 0.820 to 0.865, melting range about 38 to 54° C., refractive index ($n_D^{60}$) 1.460 to 1.474. The Apiezon waxes and greases are hydrocarbon mixtures which are refined to reduce vapor pressure to a minimum.

Since the preferred saturated hydrocarbons or hydrocarbon waxes are solids or semisolids at ambient temperature, it is preferred to apply the wax coating to the chemisorbed monolayer from solution. The only requirement for the solvent selected is that it be one capable of readily dissolving the saturated hydrocarbon and not contain reactive groups which would interfere with subsequent fluorination. Suitable solvents include among others chloroform, ether, benzene and oils, ligroine, turpentine. Preferred solvents are those which are volatile at ambient temperature. Sufficient solvent is added to the high molecular weight saturated hydrocarbon to give the desired consistency for the method of application e.g., for dipping, spraying, brushing. For petrolatum and Apiezon, a 3 percent by weight solution of the wax in a solvent, e.g. isooctane, provides satisfactory viscosity for dipping and spraying. When a solvent solution of the saturated hydrocarbon is used, the solvent is allowed to evaporate prior to fluorination of the wax coating.

The hydrocarbon wax coating, for best results, should be in the range of from about 1 to about 5 microns thick. Such thickness can be attained by a single application or alternatively, built up by repeated treatment. Thicknesses less than about 1 micron tend to be discontinuous while coating thicknesses appreciably greater than 5 microns are difficult to fluorinate completely and lack adherence.

During and after the coating of the metal or ceramic with the hydrocarbon wax, excessive temperatures should be avoided, which cause melting and migration of the wax film.

The final step in the process of the invention involves fluorination of the hydrocarbon wax coating to convert the wax to the corresponding fluorocarbon.

Fluorination is conducted in the gas phase, preferably under pressure, in a reaction chamber which permits the exclusion of moisture and air, the latter elements which would interfere with the reaction. Thus, the reaction can be conducted in a vacuum or in the presence of an inert gas such as argon. While the fluorine need not be supplied to the hydrocarbon surface under pressure, it has been found that a pressure in the range of about 30 p.s.i.g. to about 70 p.s.i.g. permits the most efficient reaction. At pressures below about 30 p.s.i.g. the reaction of the fluorine with the saturated hydrocarbon or wax film is quite slow, while at pressures above about 70 p.s.i.g. there is increasing danger of possible ignition of the wax film.

While the rate of pressurization with fluorine does not affect the final results, as a precaution against possible ignition of the saturated hydrocarbon film, it is recommended that pressurization be effected at a rate considerably less than 30 p.s.i.g. per minute. A pressurization rate of about 3 p.s.i.g. per minute has been found to give excellent results.

Temperature and pressure are interdependent, i.e., high temperatures and high pressures increase the reaction rate so that low pressure combined with high temperature will give results similar to conditions including low temperatures and high pressures. For pressures in the range of about 30 p.s.i.g. to about 70 p.s.i.g., ambient operating temperature is preferred. There appears to be no advantage in the fluorination at temperatures either higher or lower than ambient temperatures. The combination of high temperature and high pressure should be avoided for safety reasons.

Reaction time should be sufficient to convert at least 85 percent of the saturated hydrocarbon or wax film to the corresponding fluorocarbon, which point can be measured by the weight gain of the coating and the infrared spectrum of the stripped coating. The exact time will depend upon the temperature and pressure of fluorination as well as on the identity and thickness of the wax film. Typically, a petrolatum film of 1 to about 5 microns in thickness is nearly completely fluorinated at room temperature in 2 hours at 45 p.s.i.g. to about 70 p.s.i.g., and in 4 to 6 hours at 30 p.s.i.g.

The reaction between fluorine and the hydrocarbon involves substantially replacement of hydrogen in the hydrocarbon with fluoride, with the formation of hydrogen fluoride.

The fluorocarbon coating produced on the metal or ceramic substrate according to the process of the invention is more adherent than coatings produced by prior art methods. It is believed that the chemisorbed monomolecular layer of polar organic material functions to lock the perfluorinated hydrocarbon or perfluorinated coating to the metal or ceramic substrate by a chemical bond to provide the exceptional adherency characteristic of the fluorocarbon coating of the invention. Without the preliminary chemisorption treatment, no adherent films can be produced.

The following examples are presented for the purpose of illustrating the invention and are in no way intended to constitute a limitation thereof.

EXAMPLE 1

A metal coupon of 316 stainless steel (an austenic stainless steel which contains a minimum chromium content of 16 percent and a minimum nickel content of 7 percent) of the following dimensions, 0.5 inch × 2.0 inch × 0.030 inch was degreased with trichloroethylene and then immersed for one-half minute in hot 1:1 HCl, rinsed in distilled water and dried. The coupon was then immersed for 1 hour in a 1 percent by weight solution of dodecanoic acid in isooctane (2,2,4-trimethylpentane) to form a chemisorbed monolayer. At the end of this period the coupon was rinsed in pure isooctane and dried. The dry coupon was then dipped in a 3 percent by weight solution of U.S.P. petrolatum in octane, removed from the solution and air dried in a horizontal position so as to produce a uniform, residual petrolatum film. The coupon was then suspended by slender stainless steel wires in a pressure vessel which was evacuated and pressurized to 45 p.s.i.g. at a rate of 3 p.s.i.g. per minute with gaseous fluorine. At the end of 2 hours, the pressure vessel was vented, evacuated, back filled with nitrogen gas and the coupon removed. The following weight gain data was obtained.

| | |
|---|---|
| weight of the petrolatum film before fluorination: | 0.0024 g. |
| Final weight of the coating after fluorination: | 0.0073 g. |
| Increase factor: | 3.04 |

The coupon was found to have a thin, hard, adherent fluorocarbon coating of about 2 microns in thickness.

EXAMPLE 2

A stainless steel 316 coupon was coated following the procedure of example 1 except that a 3 percent solution of Apiezon N grease in isooctane was used in place of the petrolatum solution. The following weight gain data was obtained

| | |
|---|---|
| Weight of the Apiezon N film before fluorination | 0.0021 g. |
| Final weight of the coating after fluorination: | 0.0063 g. |
| Increase factor: | 3.00 |

The coupon was found to have a thin, hard, corrosion resistant adherent fluorocarbon coating of about 2 microns in thickness.

EXAMPLE 3

Coupons of aluminum alloy 7075-16 containing 5.5 percent Zn, 2.5 percent mg., 1.5 percent Cu and 0.3 percent Cr having the dimensions, 1 inch × 1 inch × 0.050 inch were immersed for 10 minutes in an aqueous solution containing 1 percent by weight HF and 1 percent by weight $HNO_3$, rinsed in distilled water and dried, to remove oxide scale and other contaminants from the surface. The coupons were then immersed for 2 hours in a 1 percent solution of decanoic acid in isooctane to effect chemisorption of a monolayer thereon. At the end of this period, the coupons were removed from the bath and rinsed once in isooctane, followed by spray coating with a 3 percent by weight solution of U.S.P. petrolatum in isooctane. One coating was applied and the coupons air dried. The dry coupons were then suspended in a pressure vessel which was evacuated, and pressurized to 55 p.s.i.g. gaseous flurine at a rate of 3 p.s.i.g. per minute. After 2-½ hours at 55 p.s.i.g. at ambient temperature, the system was vented, evacuated, back-filled with nitrogen gas and the coupons removed.

The aluminum alloy coupons were found to have a dense, adherent, corrosion resistant fluorocarbon coating of 2 microns in thickness.

EXAMPLE 4

The procedure of example 3 was repeated to fluorocarbon coat 3 inch × 9 inch × 0.025 inch coupons of aluminum alloy 2014 containing 4.4 percent Cu, 0.8 percent Si, 0.8 percent Mn, 0.4 percent Mg, except that the coupons were precleaned by a 5 minute immersion in Oakite 33, understood to be an aqueous solution of a mild acid detergent of phosphoric acid base with wetting agents and glycol ether solvent, prior to immersion in the aqueous $HF-HNO_3$ bath; and fluorination was carried out at 50 p.s.i.g. for 2 hours.

The coupons were found to have a dense, hard, adherent corrosion resistant coating of about 2 microns in thickness.

EXAMPLE 5

The procedure of example 4 was repeated except that prior to exposure of the coupons to decanoic acid solution, the aluminum alloy coupons were first immersed for 5 minutes in a solution comprising 525 g. caustic soda, 100 g. zinc oxide, and sufficient water to make 1 liter of solution, to form a thin, adherent zinc film on the surface of the aluminum. The coupons were then removed from this solution, thoroughly rinsed with distilled water and air dried, followed by exposure to decanoic acid solution and following the remaining steps of the procedure of example 4. In this example, the zinc forms the substrate for the fluorocarbon coating.

The coated coupons were found to have a thin, dense, hard, adherent coating of fluorocarbon of approximately 2 microns in thickness.

EXAMPLE 6

Substantially the procedure of example 4 was repeated except that fluorination was carried out at 30 p.s.i.g. for 6 hours. The coating produced on the aluminum alloy coupons was comparable to the coating produced by the process of example 4.

EXAMPLE 7

The procedure of example 1 is repeated to form a fluorocarbon polymer coating on the interior surfaces of a stainless steel 316 tank, using the tank as the reaction chamber. The interior of the tank is found to have a thin, dense, adherent, corrosion resistant fluorocarbon coating of approximately 2 microns in thickness.

EXAMPLE 8

Substantially the procedure of example 1 is repeated to produce a fluorocarbon polymer coating on alumina ceramic specimen. The fluorocarbon coating produced has a thickness of approximately 2 microns.

Various modifications are contemplated and may be resorted to by those skilled in the art without departing from the spirit and scope of the invention as defined by the appended claims.

What I claim is:

1. A method for producing a fluorocarbon coating on metals and ceramics comprising treating the metal or ceramic substrate which is free of contaminants and oxide scale with a polar organic material, said polar organic material being a saturated fatty acid of the formula $C_nH_{2n+1}COOH$ wherein $n$ is an integer from about 4 to about 26, for a time sufficient to allow chemisorption of a monomolecular layer of said polar organic material on said substrate, coating said monomolecular layer with a layer of a high molecular weight saturated hydrocarbon, said saturated hydrocarbon being a semisolid to solid hydrocarbon wax having an average of about 17 to about 50 carbon atoms and complex mixtures thereof, contacting said hydrocarbon layer with gaseous fluorine in the substantial absence of air and moisture, and converting said hydrocarbon layer to the corresponding fluorocarbon.

2. A method as defined in claim 1, wherein said fluorination with gaseous fluorine is carried out for a time sufficient to effect in excess of 85 percent conversion of said hydrocarbon layer to the corresponding fluorocarbon.

3. A method as defined in claim 1 wherein said substrate is a metal.

4. A method as defined in claim 1, wherein said chemisorption is effected from a solution of said fatty acid in a nonpolar solvent for said fatty acid.

5. A method as defined in claim 4, wherein said solution is a 1 percent solution by weight, said nonpolar solvent is volatile at ambient temperature, and said time for chemisorption is about 1 hour.

6. A method as defined in claim 1 wherein said saturated hydrocarbon is one which is semisolid to solid at ambient temperature and is applied to said monomolecular layer of polar organic material as a solution in a volatile nonpolar solvent for said hydrocarbon.

7. A method as defined in claim 1 wherein said hydrocarbon layer has a thickness in the range of about 1 to about 5 microns.

8. A method as defined in claim 1, wherein said fluorine gas is applied to said hydrocarbon layer at a pressure in the range of about 30 p.s.i.g. to about 70 p.s.i.g. at ambient temperature.

9. A method as defined in claim 1 wherein said substrate is a metal, and said saturated hydrocarbon is semisolid to solid at ambient temperature, and wherein said chemisorption is effected from a solution of said fatty acid in a volatile nonpolar solvent for said fatty acid, said saturated hydrocarbon in the form of a thin, uniform layer is applied from a solution in a volatile nonpolar solvent for said hydrocarbon, said fluorine is applied to said wax layer at a pressure in the range of about 30 p.s.i.g. to about 70 p.s.i.g. at ambient temperature.

10. A method as defined in claim 9, wherein said saturated hydrocarbon is petrolatum.

11. A fluorocarbon coated ceramic or metal comprising a metal or ceramic substrate having a chemically bonded, adherent, integral layer comprised of a monomolecular layer of a saturated fatty acid of the formula $C_nH_{2n+1}COOH$ wherein $n$ is about 4 to about 26, chemisorbed on said substrate, said monomolecular layer having a chemically bonded, integral, thin, continuous overcoating of a fluorinated high molecular weight saturated hydrocarbon derived from a semisolid to solid hydrocarbon wax at ambient temperature having an average of about 17 to about 50 carbon atoms and complex mixtures thereof.

12. A fluorocarbon coated metal as defined in claim 11, wherein said fluorinated high molecular weight saturated hydrocarbon overcoating thickness ranging from about 1 to about 5 microns.

* * * * *